(12) United States Patent
Kitagawa et al.

(10) Patent No.: US 11,380,940 B2
(45) Date of Patent: Jul. 5, 2022

(54) METHOD FOR MANUFACTURING NONAQUEOUS ELECTROLYTE SECONDARY BATTERY

(71) Applicant: SANYO Electric Co., Ltd., Daito (JP)

(72) Inventors: Takanori Kitagawa, Osaka (JP); Tomomichi Ueda, Osaka (JP); Koichi Kusagawa, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 271 days.

(21) Appl. No.: 16/755,062

(22) PCT Filed: Oct. 17, 2018

(86) PCT No.: PCT/JP2018/038571
§ 371 (c)(1),
(2) Date: Apr. 9, 2020

(87) PCT Pub. No.: WO2019/082748
PCT Pub. Date: May 2, 2019

(65) Prior Publication Data
US 2021/0194062 A1      Jun. 24, 2021

(30) Foreign Application Priority Data
Oct. 27, 2017   (JP) .............................. JP2017-208153

(51) Int. Cl.
*H01M 10/0587*   (2010.01)
*H01M 50/538*    (2021.01)
(Continued)

(52) U.S. Cl.
CPC ..... *H01M 10/0587* (2013.01); *H01M 50/538* (2021.01); *H01M 10/0525* (2013.01);
(Continued)

(58) Field of Classification Search
CPC ........... H01M 10/0587; H01M 50/538; H01M 50/536; H01M 10/0525; Y02P 70/50; Y02E 60/10
(Continued)

(56) References Cited

U.S. PATENT DOCUMENTS

2006/0240319 A1   10/2006  Chun
2012/0005450 A1    1/2012  Bomma et al.
2013/0316209 A1   11/2013  Masumoto et al.

FOREIGN PATENT DOCUMENTS

JP      2-132758 A     5/1990
JP     11-111326 A     4/1999
(Continued)

OTHER PUBLICATIONS

International Search Report dated Jan. 22, 2019, issued in counterpart Application No. PCT/JP2018/038571, with English translation (5 pages).

*Primary Examiner* — Jonathan G Jelsma
*Assistant Examiner* — Omar M Kekia
(74) *Attorney, Agent, or Firm* — WHDA, LLP (57) ABSTRACT

A method for manufacturing a nonaqueous electrolyte secondary battery, when an electrode tab is provided at a longitudinal-direction end portion of an electrode located at a winding-start side of an electrode body, the method being capable of sufficiently reducing damage on a separator and the electrode in a process for manufacturing the electrode body. In a manufacturing step of one example of an embodiment, a negative electrode tab is bonded to a longitudinal-direction end portion of a negative electrode to be located at a winding-start side of an electrode body, the negative electrode tab is processed so that a width-direction central portion of the negative electrode tab at least bulges toward a winding-outer side of the electrode body, and while a gap is formed between the negative electrode tab and a winding
(Continued)

core, a positive electrode, the negative electrode, and a separator are wound around the winding core.

6 Claims, 3 Drawing Sheets

(51) Int. Cl.
　　　*H01M 50/536*　　　(2021.01)
　　　*H01M 10/0525*　　(2010.01)
(52) U.S. Cl.
　　　CPC ............ *H01M 50/536* (2021.01); *Y02E 60/10* (2013.01); *Y02P 70/50* (2015.11)
(58) Field of Classification Search
　　　USPC ........................................................ 429/209
　　　See application file for complete search history.

(56) References Cited

FOREIGN PATENT DOCUMENTS

| | | |
|---|---|---|
| JP | 2006-310283 A | 11/2006 |
| JP | 2007-103218 A | 4/2007 |
| JP | 2012-23011 A | 2/2012 |
| WO | 2012/111061 A1 | 8/2012 |

METHOD FOR MANUFACTURING NONAQUEOUS ELECTROLYTE SECONDARY BATTERY

TECHNICAL FIELD

The present disclosure relates to a method for manufacturing a nonaqueous electrolyte secondary battery.

BACKGROUND ART

Heretofore, in a winding type electrode body of a nonaqueous electrolyte secondary battery, as one method to improve performances, such as an increase in capacity and a reduction in internal resistance, of a battery, the structure in which an electrode tab is bonded to a longitudinal-direction end portion of an electrode located at a winding-start side of the electrode body has been known. For example, PTL 1 has disclosed the structure in which a positive electrode tab is welded to a longitudinal-direction end portion of a positive electrode located at a winding-start side of an electrode body, and in which the tab is curved at the same curvature radius as that of a winding core.

CITATION LIST

Patent Literature

PTL 1: Japanese Published Unexamined Patent Application No. 2-132758

SUMMARY OF INVENTION

Technical Problem

Incidentally, when an electrode tab is provided at a longitudinal-direction end portion of an electrode located at a winding-start side of an electrode body, in a process for manufacturing the electrode body, a separator may be damaged at a portion to be overlapped with the electrode tab, and/or a metal powder, an active material powder, and/or the like may be generated by the damage on the electrode, so that defects, such as current leakage, are assumed to occur. The damage on the separator and the electrode is particularly liable to occur at a portion to be overlapped with a tab edge. In addition, according to the technique disclosed in PTL 1, although the influence of the tab edge can be reduced, a method to further reduce the damage on the separator and the electrode is required.

The present disclosure aims to provide a method for manufacturing a nonaqueous electrolyte secondary battery in which in a process for manufacturing an electrode body which includes an electrode tab at a longitudinal-direction end portion of an electrode located at a winding-start side of the electrode body, damage on a separator and the electrode caused by the presence of the electrode tab can be sufficiently reduced.

Solution to Problem

A method for manufacturing a nonaqueous electrolyte secondary battery according to an aspect of the present disclosure is a method for manufacturing a nonaqueous electrolyte secondary battery including an electrode body in which a positive electrode and a negative electrode are wound with at least one separator interposed therebetween, and the method described above comprises, in at least one of the positive electrode and the negative electrode, a step of bonding an electrode tab to a longitudinal-direction end portion of the electrode to be located at a winding-start side of the electrode body; a step of processing the electrode tab so that a width-direction central portion of the electrode tab along the longitudinal direction of the electrode at least bulges toward a winding-outer side of the electrode body; and while a gap is formed between the electrode tab and a winding core, a step of winding the electrode and the separator around the winding core.

Advantageous Effects of Invention

According to the method for manufacturing a nonaqueous electrolyte secondary battery which is one aspect of the present disclosure, in a process for manufacturing an electrode body in which an electrode provided with an electrode tab at a longitudinal-direction end portion to be located at a winding-start side of the electrode body is wound, damage on a separator and the electrode caused by the electrode tab can be reduced.

DESCRIPTION OF EMBODIMENT

As described above, in a process for manufacturing an electrode body in which an electrode provided with an electrode tab at a longitudinal-direction end portion to be located at a winding-start side of the electrode body is wound, a separator to be wound around the outside of the electrode tab is damaged, and/or a metal powder and/or an active material powder is generated by the damage on the electrode to be wound around the outside of the electrode tab, so that defects, such as current leakage, may arise in some cases. Through intensive research carried out by the present inventors to overcome the problem described above, it was found that in a state in which a gap is formed between the electrode tab and a winding core by processing at least a width-direction central portion of the electrode tab, when the electrode and the separator are wound around the winding core, damage on the separator and the electrode caused by the electrode tab can be reduced. The reason for this is believed that by the presence of the gap formed between the winding core and the width-direction central portion of the electrode tab, the stress acting on the separator and the electrode during the winding can be reduced. That is, it is assumed that since the stress generated when the separator and the electrode are fastened by winding is released to a gap portion, the stress caused by a tab edge to the separator and the electrode is significantly reduced.

Hereinafter, one example of an embodiment of the present disclosure will be described in detail. Hereinafter, as a nonaqueous electrolyte secondary battery including an electrode body to be manufactured by the following manufacturing method, although a cylindrical battery in which a winding type electrode body 14 is received in a cylindrical battery case 15 will be described by way of example, the battery case is not limited to have a cylindrical shape and may have a square shape. In addition, in this specification, for the convenience of illustration, a sealing body 17 side of the battery case 15 and a bottom portion side of an exterior package can 16 are described as an "upper side" and a "lower side", respectively.

Figure 1:
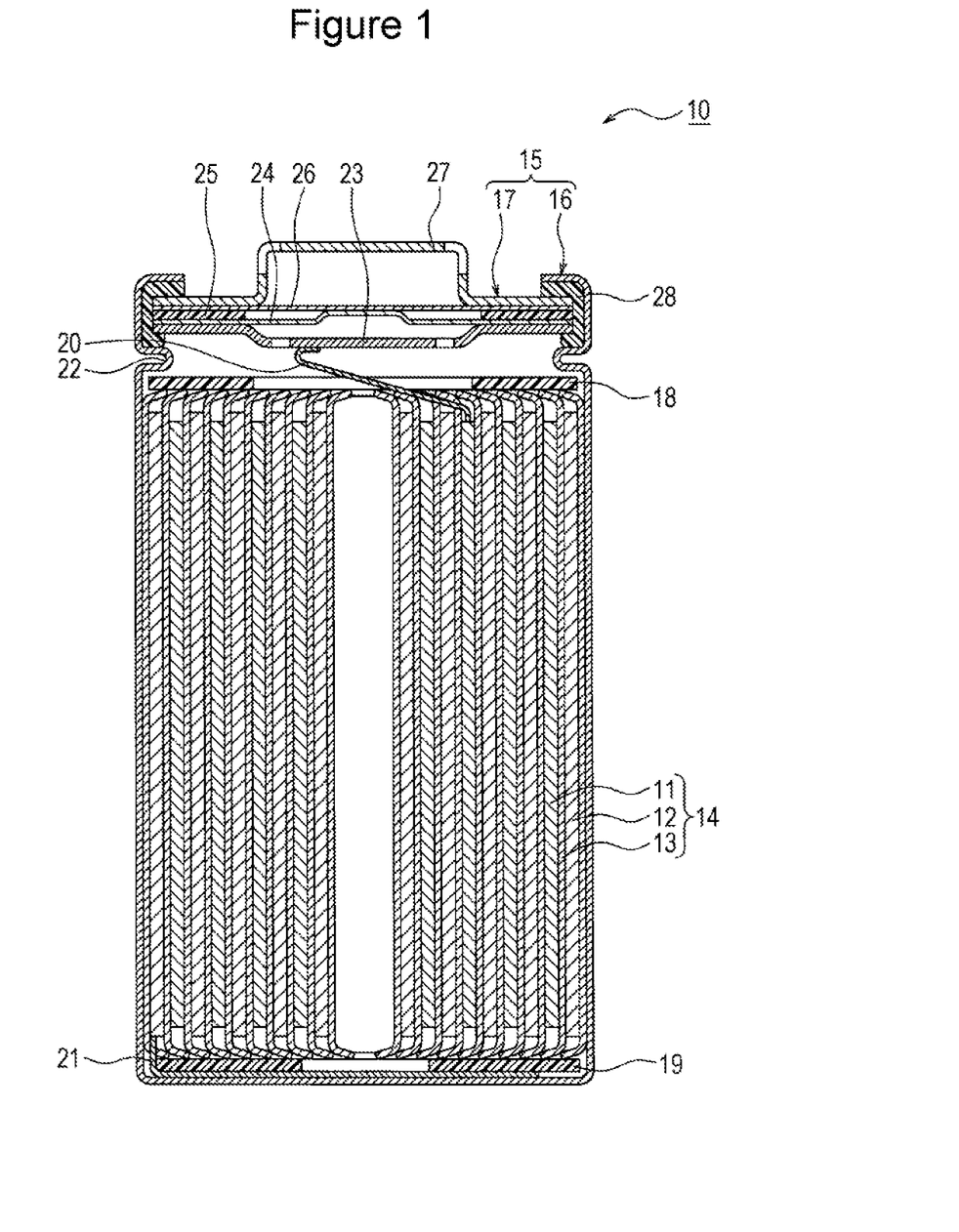
FIG. 1 is a longitudinal-direction cross-sectional view of a nonaqueous electrolyte secondary battery which is an example of an embodiment.
Figure 2:
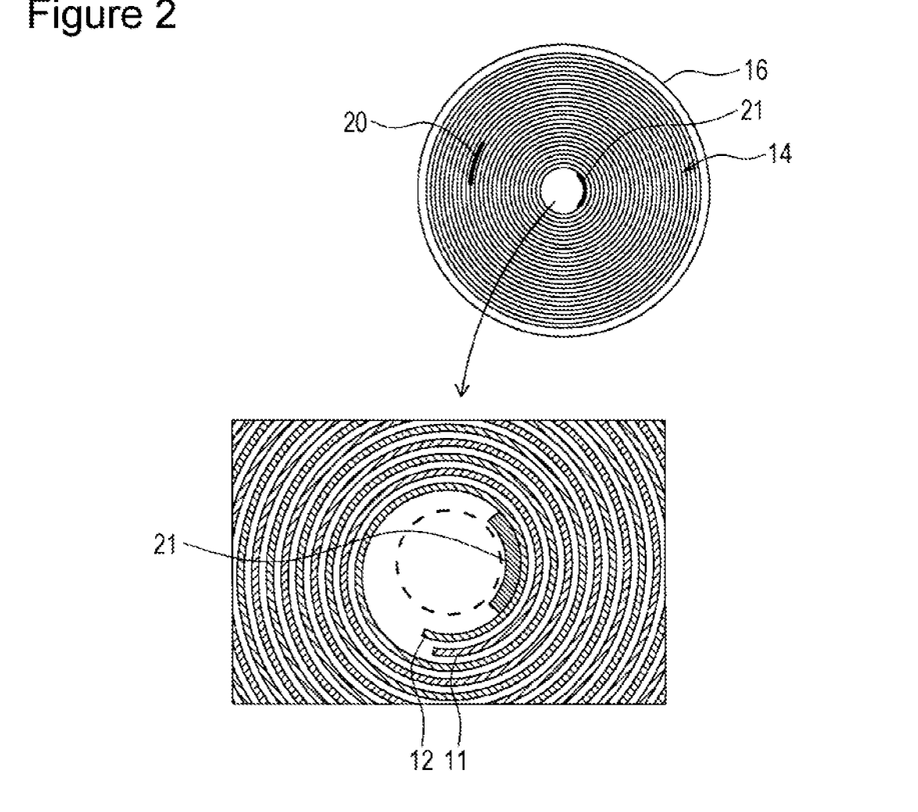
FIG. 2 includes transverse-direction cross-sectional views of the nonaqueous electrolyte secondary battery which is the example of the embodiment.

FIG. 1 is a longitudinal-direction (axial-direction) cross-sectional view of a nonaqueous electrolyte secondary battery 10 which is one example of the embodiment, and FIG. 2 includes transverse-direction (radius-direction) cross-sectional views of the nonaqueous electrolyte secondary battery 10. In an enlarged view of FIG. 2, a separator 13 is not shown.

As shown in FIGS. 1 and 2 by way of example, the nonaqueous electrolyte secondary battery 10 includes the electrode body 14, a nonaqueous electrolyte (not shown), and the battery case 15 which receives the electrode body 14 and the nonaqueous electrolyte. The electrode body 14 has a winding structure in which a positive electrode 11 and a negative electrode 12 are wound with at least one separator 13 interposed therebetween. The battery case 15 is formed of the bottom-closed cylindrical exterior package can 16 and a sealing body 17 which seals an opening portion of the exterior package can 16. In addition, the nonaqueous electrolyte secondary battery 10 also includes a resin-made gasket 28 disposed between the exterior package can 16 and the sealing body 17.

The nonaqueous electrolyte contains a nonaqueous solvent and an electrolyte salt dissolved in the nonaqueous solvent. As the nonaqueous solvent, for example, there may be used an ester, an ether, a nitrile, an amide, or a mixed solvent containing at least two of those mentioned above. The nonaqueous solvent may also contain a halogen substitute in which at least one hydrogen atom of each of the solvents mentioned above is replaced by a halogen atom, such as fluorine. In addition, the nonaqueous electrolyte is not limited to a liquid electrolyte and may be a solid electrolyte using a gel polymer or the like. As the electrolyte salt, for example, a lithium salt, such as $LiPF_6$, may be used.

The electrode body 14 is formed of the long positive electrode 11, the long negative electrode 12, the two long separators 13, a positive electrode tab 20 bonded to the positive electrode 11, and a negative electrode tab 21 bonded to the negative electrode 12. In order to suppress the precipitation of lithium, the negative electrode 12 is formed to be larger than the positive electrode 11 by one size or more. That is, the negative electrode 12 is formed to be larger than the positive electrode 11 in a longitudinal direction and a short direction (in a top-bottom direction). The two separators 13 are each formed to be larger than the positive electrode 11 by at least one size or more and are disposed, for example, so as to sandwich the positive electrode 11.

In this embodiment, the positive electrode tab 20 is provided at a longitudinal-direction central portion of the positive electrode 11 so as to be apart from a winding-start side end portion and a winding-finish side end portion of the electrode body 14. On the other hand, the negative electrode tab 21 is provided at a longitudinal-direction end portion of the negative electrode 12 which is located at a winding-start side of the electrode body 14. Besides the negative electrode tab 21, another negative electrode tab may also be provided at the other longitudinal-direction end portion of the negative electrode 12 located at a winding-finish side of the electrode body 14. Alternatively, the positive electrode tab 20 may be provided at a longitudinal-direction end portion of the positive electrode 11 located at the winding-start side of the electrode body 14, and the negative electrode tab 21 may be provided at a position other than that of the longitudinal-direction end portion of the negative electrode 12 located at the winding-start side of the electrode body 14.

The positive electrode 11 includes a belt-shaped positive electrode collector and positive electrode mixture layers formed on two surfaces of the collector. In the positive electrode 11, an exposed portion at which a surface of the positive electrode collector is exposed is formed, for example, at a longitudinal-direction intermediate portion of the collector, and the positive electrode tab 20 is bonded to this exposed portion. The positive electrode mixture layer is formed of a positive electrode active material, an electrically conductive agent, and a binder.

As the positive electrode active material, for example, there may be mentioned a lithium composite metal oxide containing at least one transition metal element selected from Co, Mn, and Ni. The lithium composite metal oxide may also contain other metal elements, such as Al, Mg, and Zr.

The negative electrode 12 includes a belt-shaped negative electrode collector 30 and negative electrode mixture layers 31 formed on two surfaces of the negative electrode collector, and in the negative electrode 12, an exposed portion 33 (see FIG. 4) at which a surface of the negative electrode collector 30 is exposed is formed at a longitudinal-direction end portion of the negative electrode 12 to be located at the winding-start side of the electrode body 14, and the negative electrode tab 21 is bonded to the exposed portion 33. The negative electrode mixture layer is formed of a negative electrode active material and a binder, and if needed, an electrically conductive agent may also be contained. The negative electrode active material is not particularly limited as long as reversibly occluding and releasing lithium ions, and for example, there may be used a carbon material, such as a natural graphite or an artificial graphite, a lithium titanium composite oxide, a metal, such as Si or Sn, forming an alloy with lithium, an alloy containing the metal mentioned above, or a composite oxide.

As the separator 13, a porous sheet having an ion permeability and an electrically insulating property may be used. The separator 13 may have either a monolayer structure or a multilayer structure and, for example, may be formed of a polyolefin resin, such as a polyethylene or a polypropylene, a cellulose, or the like. When the polyolefin resin is used, a heat resistant layer is preferably provided by applying an aramid resin on a base material surface formed of the polyolefin resin. The heat resistant layer may also be formed using a resin containing ceramic particles.

Insulating plates 18 and 19 are disposed on an upper side and a lower side of the electrode body 14, respectively. In the example shown in FIG. 1, the positive electrode tab 20 fitted to the positive electrode 11 extends to the sealing body 17 side through a through-hole of the insulating plate 18, and the negative electrode tab 21 fitted to the negative electrode 12 extends to a bottom portion side of the exterior package can 16 along the outside of the insulating plate 19. The positive electrode tab 20 is connected by welding or the like to a bottom surface of a filter 23 functioning as a bottom plate of the sealing body 17, and a cap 27 which is a top plate of the sealing body 17 electrically connected to the filter 23 functions as a positive electrode terminal. The negative electrode tab 21 is connected by welding or the like to an inner surface of the bottom portion of the exterior package can 16, and the exterior package can 16 functions as a negative electrode terminal.

The exterior package can 16 is, for example, a bottom-closed cylindrical metal-made container. As described above, between the exterior package can 16 and the sealing body 17, the gasket 28 is provided, and an internal space of the battery case 15 is sealed. The exterior package can 16 includes a groove portion 22 which is formed, for example, by pressing a side surface portion from the outside and which supports the sealing body 17. The groove portion 22 is preferably formed to have a ring shape along a circumferential direction of the exterior package can 16, and an upper surface of the groove portion 22 supports the sealing body 17. In addition, an upper end portion of the exterior package can 16 is bent inside so as to be caulked to a peripheral portion of the sealing body 17.

The sealing body 17 has the structure in which the filter 23, a lower valve 24, an insulating member 25, an upper valve 26, and the cap 27 are sequentially laminated in this order from an electrode body 14 side. The members forming the sealing body 17 each have, for example, a disc shape or a ring shape, and the members other than the insulating member 25 are electrically connected to each other. The lower valve 24 and the upper valve 26 are connected to each other at the central portions thereof, and between peripheral portions thereof, the insulating member 25 is provided. When the inside pressure of the battery is increased by abnormal heat generation, the lower valve 24 is deformed so as to push the upper valve 26 to a cap 27 side and is fractured, and hence, an electrical path between the lower valve 24 and the upper valve 26 is disconnected. When the inside pressure is further increased, the upper valve 26 is fractured, and hence, a gas is exhausted from an opening portion of the cap 27.

Figure 3:
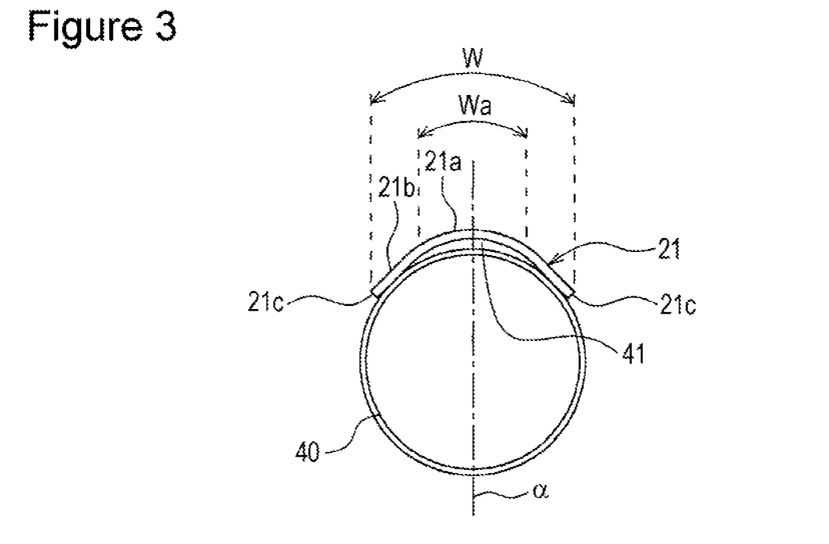
FIG. 3 is a view showing a negative electrode tab which is an example of the embodiment.

Hereinafter, with appropriate reference to FIGS. 3 and 4, one example of a method for manufacturing the nonaqueous electrolyte secondary battery 10 will be described in detail, the method including a winding step of forming the electrode body 14. FIG. 3 is a view showing the negative electrode tab 21 in a process for manufacturing the electrode body 14, and FIG. 4 is a view illustrating a method for processing the negative electrode tab 21.

Figure 4:
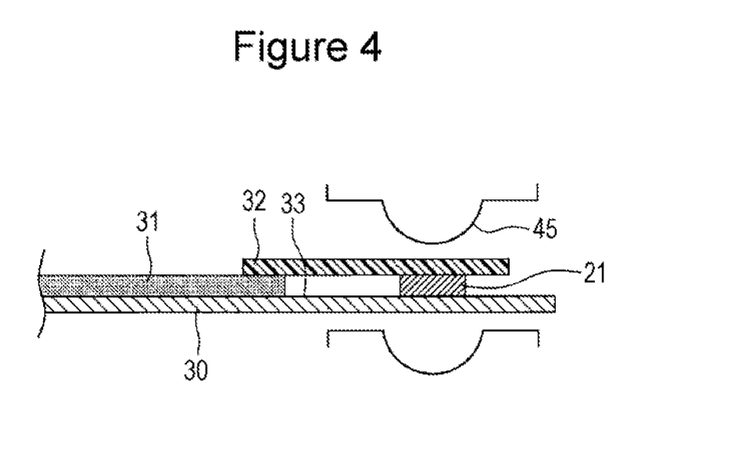
FIG. 4 is a view illustrating a method for processing a negative electrode tab which is an example of the embodiment.

As shown in FIGS. 3 and 4, in the winding step of forming the electrode body 14, a winding core 40 is used, and in addition, in the state in which a gap 41 is formed between the negative electrode tab 21 and the winding core 40 by processing the negative electrode tab 21, the positive electrode 11, the negative electrode 12, and the separators 13 are wound around the winding core 40. In addition, when the positive electrode tab 20 is provided at the longitudinal-direction end portion of the positive electrode 11 to be located at the winding-start side of the electrode body 14, by processing the positive electrode tab 20, a gap is formed between the positive electrode tab 20 and the winding core 40. The structures of the positive electrode 11 and the negative electrode 12 are not particularly limited, and the electrodes each may be formed by a related known method.

A manufacturing step of the nonaqueous electrolyte secondary battery 10 includes the following steps.

(1) A step of bonding the negative electrode tab 21 to the longitudinal-direction end portion of the negative electrode 12 to be located at the winding-start side of the electrode body 14.

(2) A step of processing the negative electrode tab 21 so that a width-direction central portion of the negative electrode tab 21 at least bulges toward a winding-outer side of the electrode body 14 (processing step of the negative electrode tab 21).

(3) A step of winding the positive electrode 11, the negative electrode 12, and the separators 13 around the winding core 40 in the state in which the gap 41 is formed between the negative electrode tab 21 and the winding core 40.

In addition, the width direction of the negative electrode tab 21 indicates a direction along the longitudinal direction of the negative electrode 12. The negative electrode tab 21 is, in general, a belt-shaped electrically conductive member (the same is also applied to the positive electrode tab 20). A width W of the negative electrode tab 21 is, for example, 1 mm≤W≤πR (R indicates a radius of the winding core 40) and is preferably 2 to 5 mm as a preferable example.

In the above step (1), the negative electrode tab 21 is bonded to the exposed portion 33 formed at the longitudinal-direction end portion of the negative electrode 12. The negative electrode tab 21 is preferably welded to the exposed portion 33. As is the negative electrode tab 21, the positive electrode tab 20 is also welded to the exposed portion of the positive electrode 11.

In order to easily weld the negative electrode tab 21, the above step (2) is preferably performed after the above step (1). However, the order of the above steps (1) and (2) is not particularly limited.

In the above step (3), the positive electrode 11 and the negative electrode 12 are spirally wound with the separators 13 interposed therebetween. In this step, the cylindrical hollow winding core 40 is used, and the positive electrode 11, the negative electrode 12, and the separators 13 are wound around the winding core 40. Although the winding core 40 may be removed after the electrode body 14 is manufactured, the winding core 40 may be allowed to remain as a core member of the electrode body 14. When the winding core 40 is removed, a hollow portion is formed at the center of the electrode body 14.

At the winding-start side end portion of the electrode body 14, in general, the two separators 13 overlapped with each other each extend to the winding-start side beyond the two electrodes, that is, the positive electrode 11 and the negative electrode 12. The winding of the electrodes and the separators 13 is performed such that in the state in which the two separators 13 are sandwiched between a pair of the winding cores 40, the winding cores 40 are rotated so as to wind the electrodes and the separators 13. For example, a longitudinal-direction end portion of each separator 13 located at the winding-start side of the electrode body 14 is located at the winding-start side than the longitudinal-direction end portion of the negative electrode 12, and the longitudinal-direction end portion of the negative electrode 12 is located at the winding-start side than the longitudinal-direction end portion of the positive electrode 11.

As described above, the winding of the electrodes and the separators 13 is performed in the state in which the gap 41 is formed between the winding core 40 and the width-direction central portion of the negative electrode tab 21 by at least processing the width-direction central portion thereof. When the electrodes and the separators 13 are wound, a tension is applied to the electrodes and the separators 13. Hence, although portions at which the electrodes and the separators 13 are overlapped with tab edges 21c (two width-direction end portions of the negative electrode tab 21) are stressed, the influence of the tab edges 21c can be reduced by the formation of the gap 41, and as a result, the damages on the electrodes and the separators 13 can be reduced.

The negative electrode 12 is preferably disposed so that the negative electrode tab 21 faces a winding core 40 side. The negative electrode tab 21 is, for example, in direct contact with the winding core 40, and the gap 41 is formed between the winding core 40 and the width-direction central portion of the negative electrode tab 21. In addition, between the negative electrode 12 and the winding core 40, the separator 13 may also be disposed, and in this case, the gap 41 formed between the winding core 40 and the negative electrode tab 21 is disposed between the separator 13 disposed along the surface of the winding core 40 and the width-direction central portion of the negative electrode tab 21.

As shown in FIG. 4 by way of example, the negative electrode tab 21 can be processed by a mold 45 including a pair of a male mold and a female mold. For example, the exposed portion 33 to which the negative electrode tab 21 is welded is press-processed using the mold 45. In the example shown in FIG. 4, although an insulating tape 32 is adhered to one surface of the exposed portion 33 so as to cover the negative electrode tab 21, the insulating tape 32 may also be adhered to the other surface of the exposed portion 33.

Although the negative electrode tab 21 may be processed before the insulating tape 32 is adhered, the negative electrode tab 21 is preferably processed after the insulating tape 32 is adhered. After being modified into a male mold and a female mold, a pair of metal blocks used for an electrical conductivity test of the insulating tape 32 to be adhered to the negative electrode tab 21 may be used as the mold 45.

In the above step (2), a curved portion 21a which bulges toward the winding-outer side of the electrode body 14 is preferably formed at the width-direction central portion of the negative electrode tab 21. As long as the gap 41 is formed between the negative electrode tab 21 and the winding core 40, the shape of the curved portion 21a is not particularly limited. However, the negative electrode tab 21 is preferably processed so as to form a curved portion 21a having a curvature radius R1 smaller than a radius R of the winding core 40. When the curved portion 21a as described above is formed at the width-direction central portion of the negative electrode tab 21, an appropriate gap 41 can be easily formed between the winding core 40 and the width-direction central portion of the negative electrode tab 21. In addition, since the negative electrode tab 21 is gradually curved, the curved portion 21a itself is prevented from damaging the electrode and the separator 13.

The negative electrode tab 21 is preferably processed so that the curvature radius R1 of the curved portion 21a satisfies $(1/3) \times R \leq R1 \leq R$. The curvature radius R1 of the curved portion 21a more preferably satisfies $(1/3) \times R \leq R1 \leq (4/5) \times R$. In the case described above, a gap 41 which is able to more suitably reduce the damage on the electrode and the separator 13 can be formed. The curved portion 21a is preferably formed to have the approximately same width at two width-direction sides with respect to a width-direction center of the negative electrode tab 21.

That is, the curved portion 21a is formed in an approximately bilaterally symmetric manner with respect to an imaginary line a passing through the width-direction center of the negative electrode tab 21.

The curved portion 21a is preferably formed to have a width of 1/3 or more of a tab width W. The negative electrode tab 21 is processed, for example, so as to satisfy $(1/3) \times W \leq Wa \leq W$. In this case, Wa indicates the width (processed width) of the curved portion 21a. In this case, the gap 41 which is able to more suitably reduce the damage on the electrode and the separator 13 can be formed. In addition, the curved portion 21a is preferably formed over the entire top-bottom direction length of a portion of the negative electrode tab 21 located on the negative electrode 12.

In the above step (2), the curved portion 21a is preferably formed at the width-direction central portion of the negative electrode tab 21, and the two width-direction end portions are each preferably used as a non-processed portion 21b. In a preferable negative electrode tab 21, a curved portion 21a having a width Wa is formed at the width-direction central portion of the negative electrode tab 21, and non-processed portions 21b each having a width of $(W-Wa) \times 1/2$ are present at the two sides of the curved portion 21a. Since the approximately flat non-processed portions 21b are allowed to remain at the two sides of the curved portion 21a, compared to the case in which the entire negative electrode tab 21 is curved, the effect of reducing the damage on the electrode and the separator 13 can be further enhanced (see the following Examples 2 and 3).

EXAMPLES

Hereinafter, although the present disclosure will be further described with reference to the following Examples, the present disclosure is not limited thereto.

Example 1

[Formation of Positive Electrode]

After 100 parts by mass of lithium nickel oxide represented by $LiNi_{0.88}Co_{0.09}Al_{0.03}O_2$, 1 part by mass of acetylene black, and 0.9 parts by mass of a poly(vinylidene fluoride) were mixed together to form a mixture, an appropriate amount of N-methyl-2-pyrrolidone was further added to the mixture, so that a positive electrode mixture slurry was prepared. Subsequently, the positive electrode mixture slurry was applied on two surfaces of a long positive electrode collector formed of aluminum foil to form coating films, and the coating films thus formed were then dried. After the coating films thus dried were pressed using rollers, a predetermined electrode size was obtained therefrom by cutting, so that a positive electrode in which positive electrode mixture layers were formed on the two surfaces of the positive electrode collector was formed. An exposed portion at which no mixture layer was present and at which the surface of the collector was exposed was provided at a longitudinal-direction central portion of the positive electrode, and an aluminum-made positive electrode tab was welded to the exposed portion. In addition, an insulating tape was adhered to the positive electrode so as to cover the positive electrode tab and the exposed portion.

[Formation of Negative Electrode]

After 95 parts by mass of a graphite powder, 5 parts by mass of a Si oxide, 1 part by mass of a sodium carboxymethyl cellulose, and 1 part by mass of a dispersion of a styrene-butadiene rubber were mixed together to form a mixture, an appropriate amount of water was further added to the mixture, so that a negative electrode mixture slurry was prepared. Subsequently, the negative electrode mixture slurry was applied on two surfaces of a long negative electrode collector formed of copper foil to form coating films, and the coating films thus formed were dried. After the coating films thus dried were pressed using rollers, a predetermined electrode size was obtained therefrom by cutting, so that a negative electrode in which negative electrode mixture layers were formed on the two surfaces of the negative electrode collector was formed. An exposed portion at which no mixture layer was present and at which the surface of the collector was exposed was provided at a longitudinal-direction end portion (end portion to be located at a winding-start side of an electrode body) of the negative electrode, and a nickel-made negative electrode tab was welded to the exposed portion. In addition, an insulating tape was adhered to the negative electrode so as to cover the negative electrode tab and the exposed portion.

[Formation of Electrode Body]

By performing press processing on the longitudinal-direction end portion of the negative electrode to which the negative electrode tab was welded using a mold as shown in FIG. 4 by way of example, the negative electrode tab was curved over the entire width W (3 mm), so that a curved portion having a curvature radius R1 (0.875×R) smaller than a curvature radius R of a winding core was formed over the entire negative electrode tab. In addition, the positive electrode and the negative electrode were wound around the winding core with separators interposed therebetween which were each formed of a polyethylene-made fine porous film, so that a winding type electrode body was formed. In this case, the negative electrode was disposed so that the longitudinal-direction end portion of the negative electrode to which the negative electrode tab was welded was located at the winding-start side of the electrode body and so that the processed negative electrode tab bulged toward a winding-outer side, and while a gap was formed between the winding core and at least a width-direction central portion of the negative electrode tab, the positive electrode, the negative electrode, and the separators were wound around the winding core.

Example 2

Except for that the processed width Wa of the negative electrode tab was set to (3/4)×W, and a curved portion having a curvature radius R1 (0.875×R) was formed at the width-direction central portion of the negative electrode tab, an electrode body was formed in a manner similar to that in Example 1.

Example 3

Except for that the processed width Wa of the negative electrode tab was set to (2/3)×W, and a curved portion having a curvature radius R1 (0.875×R) was formed at the width-direction central portion of the negative electrode tab, an electrode body was formed in a manner similar to that in Example 1.

Comparative Example 1

Except for that the negative electrode tab was not processed, an electrode body was formed in a manner similar to that in Example 1.

Comparative Example 2

Except for that the negative electrode tab was processed so that the curvature radius R1 of the curved portion of the negative electrode tab was set equivalent to the curvature radius R of the winding core (R1=R), an electrode body was formed in a manner similar to that in Example 1.

Comparative Example 3

Except for that instead of using a negative electrode tab having a width W of 3 mm, a negative electrode tab having a width W of 4 mm was used, an electrode body was formed in a manner similar to that in Comparative Example 1.

[Withstand Voltage Test]

A withstand voltage test was performed in accordance with the following procedure. First, while insulating plates were disposed at an upper side and a lower side of the electrode body of each of Examples and Comparative Examples, the electrode body was inserted in an exterior package can, and the negative electrode tab was welded to an inner surface of a bottom portion of the exterior package can, so that an in-process product before a nonaqueous electrolyte was charged therein was formed. Between the exterior package can and the positive electrode tab of the in-process product, a voltage of 400 V was applied for 0.3 seconds. When a current leakage of 18 mA or more was observed between the positive electrode and the negative electrode of the in-process product, this case was judged as a withstand voltage defect. For the withstand voltage test, 1,000 in-process products of each of Examples and Comparative Examples were used. The evaluation results are shown in Table 1.

TABLE 1

| | R1 | PRESENCE OR ABSENCE OF GAP | W (mm) | Wa | DEFECT RATE OF WITHSTAND VOLTAGE (%) |
|---|---|---|---|---|---|
| EXAMPLE 1 | 0.875 × R | YES | 3 | W | 0.46 |
| EXAMPLE 2 | 0.875 × R | YES | 3 | (3/4) × W | 0.20 |
| EXAMPLE 3 | 0.875 × R | YES | 3 | (2/3) × W | 0.07 |
| COMPARATIVE EXAMPLE 1 | — | NO | 3 | — | 0.70 |
| COMPARATIVE EXAMPLE 2 | R | NO | 3 | W | 0.61 |
| COMPARATIVE EXAMPLE 3 | — | NO | 4 | — | 0.68 |

From the results shown in Table 1, it is found that a defect rate of the withstand voltage test of the electrode body in each Example is low as compared to that of the electrode body of each Comparative Example. That is, according to the method for manufacturing an electrode body of Example, the damage on the separator and the electrode caused by the negative electrode tab is reduced, and hence, it can be said that the defects, such as current leakage, are not likely to be generated. In particular, in the electrode bodies of Examples 2 and 3 in each of which the curved portion is formed at the width-direction central portion of the negative electrode tab and in each of which the two width-direction end portions are each used as a non-processed portion, a more significant effect can be obtained.

REFERENCE SIGNS LIST

10 nonaqueous electrolyte secondary battery, 11 positive electrode, 12 negative electrode, 13 separator, 14 electrode body, 15 battery case, 16 exterior package can, 17 sealing body, 18, 19 insulating plate, 20 positive electrode tab, 21 negative electrode tab, 21a curved portion, 21b non-processed portion, 21c tab edge, 22 groove portion, 23 filter, 24 lower valve, 25 insulating member, 26 upper valve, 27 cap, 28 gasket, 30 negative electrode collector, 31 negative electrode mixture layer, 32 insulating tape, 33 exposed portion, 40 winding core, 41 gap, 45 mold

The invention claimed is:

1. A method for manufacturing a nonaqueous electrolyte secondary battery including an electrode body in which a positive electrode and a negative electrode are wound with a separator interposed therebetween, the method comprising, in at least one of the positive electrode and the negative electrode:
- a step of bonding an electrode tab to a longitudinal-direction end portion of the electrode to be located at a winding-start side of the electrode body;
- a step of processing the electrode tab so that a width-direction central portion of the electrode tab along a longitudinal direction of the electrode at least bulges toward a winding-outer side of the electrode body; and
- while a gap is formed between the electrode tab and a winding core, a step of winding the electrode and the separator around the winding core.

2. The method for manufacturing a nonaqueous electrolyte secondary battery according to claim 1,
wherein the step of processing the electrode tab forms a curved portion so that the width-direction central portion of the electrode tab along the longitudinal direction of the electrode at least bulges toward the winding-outer side of the electrode body.

3. The method for manufacturing a nonaqueous electrolyte secondary battery according to claim 2,
wherein the curved portion has a curvature radius R1 smaller than a radius R of the winding core.

4. The method for manufacturing a nonaqueous electrolyte secondary battery according to claim 3,
wherein the electrode tab is processed so that the curvature radius R1 of the curved portion satisfies (⅓)× R≤R1<R.

5. The method for manufacturing a nonaqueous electrolyte secondary battery according to claim 2,
wherein the curved portion is formed at the width-direction central portion of the electrode tab, and two width-direction end portions thereof are each a no-processed portion.

6. The method for manufacturing a nonaqueous electrolyte secondary battery according to claim 2,
wherein the electrode tab is processed so that the curved portion has a width of (⅓) of the tab width or more.

\* \* \* \* \*